United States Patent [19]

Ishibe et al.

[11] Patent Number: 4,469,520

[45] Date of Patent: Sep. 4, 1984

[54] STABLE METAL PIGMENT COMPOSITIONS EMPLOYING METHYLCHLOROFORM AS SOLVENT

[75] Inventors: Nobuyuki Ishibe; Warren F. Richey; Milton S. Wing, all of Lake Jackson, Tex.

[73] Assignee: The Dow Chemical Company, Midland, Mich.

[21] Appl. No.: 568,994

[22] Filed: Jan. 9, 1984

[51] Int. Cl.$^3$ .................. C08K 7/00; C04B 31/26; C04B 31/00
[52] U.S. Cl. .................. 106/291; 106/311; 570/114
[58] Field of Search ........... 106/291, 311; 570/114

[56] References Cited

U.S. PATENT DOCUMENTS

| | | | |
|---|---|---|---|
| 3,260,760 | 7/1966 | Domen et al. | 570/116 |
| 3,629,128 | 12/1971 | Rains | 106/311 |
| 3,661,788 | 5/1972 | Campbell et al. | 570/114 |
| 4,362,573 | 12/1982 | Mackrodt et al. | 106/311 |

Primary Examiner—John Kight, III
Assistant Examiner—M. L. Moore
Attorney, Agent, or Firm—A. C. Ancona

[57] ABSTRACT

Metal pigments when combined with methylchloroform are stabilized by the addition of small amounts of aromatic diepoxides. Other known stabilizers against metals or the active of light and heat may be incorporated.

2 Claims, No Drawings

STABLE METAL PIGMENT COMPOSITIONS EMPLOYING METHYLCHLOROFORM AS SOLVENT

BACKGROUND OF THE INVENTION

Methylchloroform (1,1,1-trichloroethane) is a useful chlorinated solvent, but is much more sensitive to degradation in the presence of certain metals, particularly aluminum. Chlorinated solvents would be advantageously employed in paints containing aluminum and other metal pigments were it not for this characteristic since the flammability problem encountered when using aromatic hydrocarbons could be obviated if methylchloroform could be substituted for them.

Stabilizers for methylchloroform in contact with metal containers and equipment are well known and include such compounds as nitroalkanes, dioxanes and dioxolane, certain alcohols (both saturated and unsaturated) and epoxides such as butylene oxide. These normally stabilized formulations when placed with a metal pigment do not satisfactorily inhibit the reaction between the metals and the methylchloroform.

It would, therefore, be desirable to find a stabilizer which would be effective in such an application of the methylchloroform. Certain diglycidyl ethers of bisphenols have been found to satisfy this application.

SUMMARY OF THE INVENTION

Compositions of metal pigments, e.g. aluminum, with methylchloroform are stabilized by the addition of small amounts of aromatic polyepoxides, e.g. diglycidyl ether of bisphenol A. The compositions may contain other known stabilizers which protect against contact with metals or which are effective stabilizers against the action of heat or light on the methylchloroform. Aliphatic epoxides do not provide stabilization in the presence of metal pigments.

DETAILED DESCRIPTION OF THE INVENTION

Various epoxy resins have been found to be useful as stabilizers for methylchloroform when used in combination with metal pigments. Thus, the diglycidyl ether of bisphenol A and the polyglycidyl ether of a novolac resin are suitable as stabilizers. These and others, defined as aromatic derived materials which have an average of more than one epoxy group per molecule, which are useful are included in the following formulas:

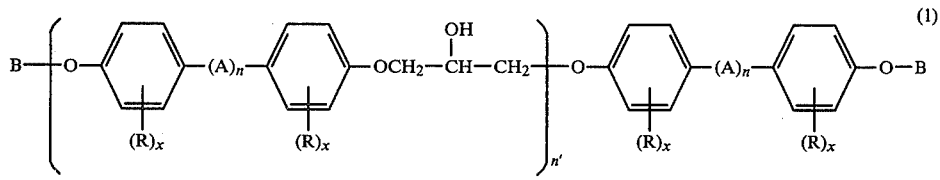

wherein A is a divalent hydrocarbon group having from 1 to 10 carbon atoms, —O—, —S—, —S—S—,

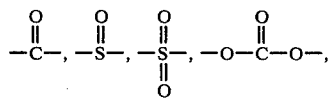

B is a glycidyl radical, n is 0 or 1 and n' is 0–1; and each R is independently hydrogen, a hydrocarbon group having from 1 to about 6 carbon atoms or a halogen and x has a value from 1 to about 2; or

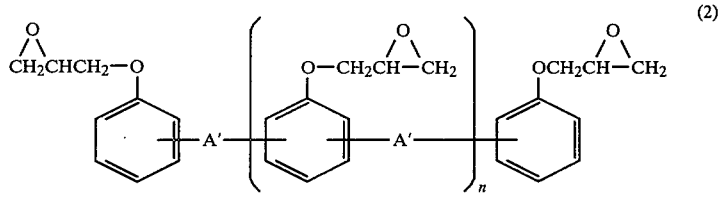

A' is a divalent hydrocarbon group having from 1 to about 10 carbon atoms or wherein R and x have the aforesaid meaning.

Metal pigments with which the stabilizer of this invention are useful are, for example, aluminum pigments commercially available from Aluminum Company of America and designated Al-1594, Al-2381, Al-2250, Al-6578 and Al-6230; copper and bronze pigments designated as Infigold 50-bronze and -copper; Richards Zn dust, DuPont Zinc Yellow and DuPont Molybdate Orange.

In determining the efficacy of certain compounds as stabilizers for methylchloroform in the presence of metals it was discovered that a useful tool for such determination was a differential thermal analytical (DTA) apparatus. Thermal behavior of a 1:1 mixture of a metal pigment with 1,1,1-trichloroethane stabilized with various inhibitors was studied by differential thermal analysis. Table I gives the results which list only exothermic reactions but not endothermic ones. These results clearly indicate that the addition of conventional stabilizers, including dioxane, nitromethane, aliphatic epoxides (epichlorohydrin, butylene oxide, or diglycidylether of dipropylene glycol), and hindered phenols (p-t-amyl phenol, 2,6-di-t-butyl-4-methyl phenol and tetrabromobisphenol A) raises the starting temperature as compared with uninhibited 1,1,1-trichloroethane, but addition of Epoxide R or Epoxide N enhances this trend more dramatically. (See Alcoa Al No. 2250, Richards Zn dust, and Infigold 50 copper powder).

TABLE I

Differential Thermal Analysis of 1,1,1-Trichloroethane in the Presence of Metal Pigments

| Experiment | Pigments | Solvent | Additive (Wt %) | Exotherm Start (°C.) |
|---|---|---|---|---|
| 1 a | aluminum paste (Alcoa No. 6230) | (Uninhibited) 1,1,1-trichloroethane | — | 194 |
| b | aluminum paste (Alcoa No. 6230) | 1,1,1 + Stabilizer A | — | 200 |
| c | aluminum paste (Alcoa No. 6230) | 1,1,1 + Stabilizer A | Epoxide R (5) | 235 |
| d | aluminum paste (Alcoa No. 6230) | 1,1,1 + Stabilizer A | Epoxide N (2) | 213 |
| e | aluminum paste (Alcoa No. 6230) | 1,1,1 + Stabilizer A | Nitromethane (5) | 200 |
| 2 a | aluminum paste (Alcoa No. 6578) | Uninhibited 1,1,1-trichloroethane | — | 190 |
| b | aluminum paste (Alcoa No. 6578) | 1,1,1 + Stabilizer A | — | 200 |
| c | aluminum paste (Alcoa No. 6578) | 1,1,1 + Stabilizer C | — | 195 |
| d | aluminum paste (Alcoa No. 6578) | 1,1,1 + Stabilizer A | Epoxide R (2) | 210 |
| e | aluminum paste (Alcoa No. 6578) | 1,1,1 + Stabilizer A | Nitromethane (5) | 200 |
| f | aluminum paste (Alcoa No. 6578) | 1,1,1 + Stabilizer A | p-t-Amylphenol (2) | 203 |
| g | aluminum paste (Alcoa No. 6578) | 1,1,1 + Stabilizer A | Epichlorohydrin (2) | 200 |
| h | aluminum paste (Alcoa No. 6578) | 1,1,1 + Stabilizer A | *Aliphatic epoxide (2) | 200 |
| i | aluminum paste (Alcoa No. 6578) | 1,1,1 + Stabilizer A | Butylene oxide (2) | 198 |
| j | aluminum paste (Alcoa No. 6578) | 1,1,1 + Stabilizer A | Tetrabromobisphenol A (2) | 201 |
| k | aluminum paste (Alcoa No. 6578) | 1,1,1 + Stabilizer A | 2,6-di-t-butyl-3-methylphenol (2) | 202 |
| 3 a | aluminum paste (Alcoa No. 2250) | 1,1,1 + Stabilizer A | — | 240 |
| b | aluminum paste (Alcoa No. 2250) | 1,1,1 + Stabilizer B | — | 237 |
| c | aluminum paste (Alcoa No. 2250) | 1,1,1 + Stabilizer A | Epoxide R (5) | 300 |
| d | aluminum paste (Alcoa No. 2250) | 1,1,1 + Stabilizer A | Epoxide N (2) | 287 |
| 4 a | aluminum paste (Alcoa No. 1594) | Uninhibited 1,1,1-trichloroethane | — | 190 |
| b | aluminum paste (Alcoa No. 1594) | 1,1,1 + Stabilizer A | — | 200 |
| c | aluminum paste (Alcoa No. 1594) | 1,1,1 + Stabilizer A | Epoxide R (2) | 215 |
| d | aluminum paste (Alcoa No. 1594) | 1,1,1 + Stabilizer A | Epoxide N (2) | 225 |
| e | aluminum paste (Alcoa No. 1594) | 1,1,1 + Stabilizer A | Nitromethane (5) | 205 |
| 5 a | zinc dust Richards | Uninhibited 1,1,1-trichloroethane | — | 140 |
| b | zinc dust Richards | 1,1,1 + Stabilizer A | — | 155 |
| c | zinc dust Richards | 1,1,1 + Stabilizer A | Epoxide R (2) | 230 |
| d | zinc dust Richards | 1,1,1 + Stabilizer A | Nitromethane (5) | 213 |
| 6 a | copper powder (Infigold 50) | 1,1,1 + Stabilizer A | — | 140 |
| b | copper powder (Infigold 50) | 1,1,1 + Stabilizer B | — | 150 |
| c | copper powder (Infigold 50) | 1,1,1 + Stabilizer A | Epoxide R (2) | 180 |
| d | copper powder (Infigold 50) | 1,1,1 + Stabilizer A | Epoxide R (5) | 190 |
| e | copper powder (Infigold 50) | 1,1,1 + Stabilizer A | Epoxide N (2) | 170 |
| f | copper powder (Infigold 50) | 1,1,1 + Stabilizer A | Nitromethane (5) | 165 |
| 7 a | Zinc Yellow (DuPont) | 1,1,1 + Stabilizer A | — | 215 |
| b | Zinc Yellow (DuPont) | 1,1,1 + Stabilizer B | — | 200 |

TABLE I-continued

Differential Thermal Analysis of 1,1,1-Trichloroethane
in the Presence of Metal Pigments

| Experiment | Pigments | Solvent | Additive (Wt %) | Exotherm Start (°C.) |
|---|---|---|---|---|
| c | Zinc Yellow (DuPont) | 1,1,1 + Stabilizer A | Epoxide R (5) | 255 |
| d | Zinc Yellow (DuPont) | 1,1,1 + Stabilizer A | Epoxide N (2) | 237 |
| e | Zinc Yellow (DuPont) | 1,1,1 + Stabilizer A | Nitromethane (5) | 190 |

A = 3.2% dioxane + 0.4% nitromethane + 0.75% butylene oxide
B = 4% dioxane + 1% nitromethane + 1.1% butylene oxide
C = 0.84% dioxane + 1.46% nitromethane + 0.57% butylene oxide + 1.04% methyl ethyl ketone + 1.03% isobutanol + 0.95% toluene
R = diglycidyl ether of bisphenol A
N = polyglycidyl ether of phenol formaldehyde resin
*Diglycidylether of dipropylene glycol.

The above known stabilizers for methylchloroform (A, B and C) as well as others may be included along with the aromatic epoxy compounds of the present invention.

The aromatic epoxy compounds of the present invention are compatible with the epoxy resin coating compositions which have been used for painting metal parts.

In another group of experiments an accelerated rate calorimeter was used in the following manner.

About 10 weight % Alcoa aluminum paste No. 6578 was placed in a Hastelloy "C" sample sphere and placed in an accelerated rate calorimetry instrument. The sample was maintained in an adiabatic state and permitted to undergo thermal decomposition due to self-heating while recording the time-temperature-pressure relationship for the runaway process. Temperature increment was 0.02° C./min. Table II summarizes exothermic behavior of various experiments using 1,1,1-trichloroethane in the presence of this aluminum paste. As shown in Table II, addition of Epoxide R raises the starting temperature for exothermic reaction, raises the maximum temperature but reduces the reaction rate. Extrapolation of plots of temperature for the maximum rate vs time to 300 days suggests the hypothetical temperature at which the runaway reaction might occur in an adiabatic state. Presence of Epoxide R raises the temperature to 100° C. from 0°–30° C. for 1,1,1-trichloroethane without Epoxide R.

TABLE II

Accelerated Rate Calorimetry of 1,1,1-Trichloroethanes
in the Presence of Alcoa Aluminum Paste No. 6578

| Solvent[a] | Rate °C./min | Exotherm Start (°C.) | Maximum Temp. (°C.) | Initiation Temp. after 300 days[b] |
|---|---|---|---|---|
| 1,1,1-Tri + Stabilizer D | 0.033 | 132 | 138 | 30 |
|  | 0.06 | 138.5 | 145 |  |
|  | 1.51 | 158 | 194 |  |
| 1,1,1-Tri + Stabilizer A | 0.12 | 132 | 136 | 18 |
|  | 0.055 | 141 | 187 |  |
| 1,1,1 Tri + Stabilizer A + 2 wt % Epoxide R | 0.068 | 160.7 | 163.9 | 105 |
|  | 0.030 | 174.9 | 320 |  |
| 1,1,1-Tri + Stabilizer A + 5 wt % Epoxide R | 0.022 | 154 | 160 | 100 |
|  | 0.038 | 164 | 170 |  |
|  | 0.065 | 172 | 200 |  |
| 1,1,1-Tri + Stabilizer A + 2 wt % nitromethane | 0.022 | 109 | 115 | <0 |
|  | 0.048 | 118 | 194 |  |
| 1,1,1-Tri + Stabilizer C | 0.024 | 108 | 115 | <0 |
|  | 0.059 | 142 | 160 |  |
|  | 0.085 | 162 | 195 |  |

[a]Stabilizer A = 3.2% Dioxane + 0.4% Nitromethane + 0.75% Butylene oxide.
Stabilizer D = 3.5% Dioxane + 0.4% Nitromethane + 0.75% Butylene oxide.
Stabilizer C = 0.84% Dioxane + 1.46% Nitromethane + 0.57% Butylene oxide + 1.04% Methyl ethyl ketone + 1.03% Isobutanol + 0.95% Toluene.
[b]Plots of temperature for a maximum rate vs. time is extrapolated to 300 days, giving hypothetical temperature at which exothermic reaction would occur.

We claim:

1. Stable methylchloroform compositions for use with metal pigments in paint formulations comprising methylchloroform, a metal pigment and an aromatic polyepoxide wherein the epoxide contains more than one epoxy group per molecule.

2. The composition of claim 1 wherein the aromatic polyepoxide has the formula $$B-\left[O-\underset{(R)_x}{\underset{|}{C_6H_3}}-(A)_n-\underset{(R)_x}{\underset{|}{C_6H_3}}-OCH_2-\underset{OH}{\underset{|}{CH}}-CH_2\right]_{n'}-O-\underset{(R)_x}{\underset{|}{C_6H_3}}-(A)_n-\underset{(R)_x}{\underset{|}{C_6H_3}}-O-B \quad (1)$$

wherein A is a divalent hydrocarbon group having from 1 to 10 carbon atoms, —O—, —S—, —S—S—,
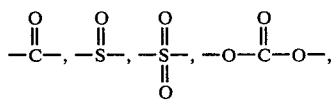
B is a glycidyl radical, n is 0 or 1 and n' is 0–1; and each R is independently hydrogen, a hydrocarbon group having from 1 to about 6 carbon atoms or a halogen and x has a value from 1 to about 2; or
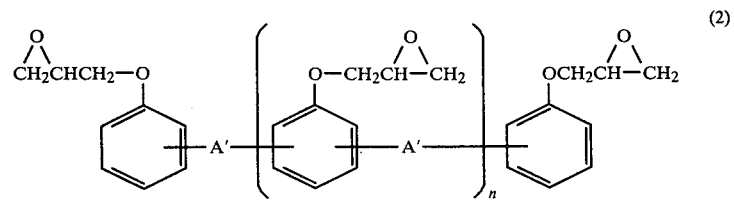
(2)
A' is a divalent hydrocarbon group having from 1 to about 10 carbon atoms or
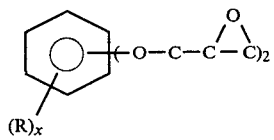
(3)
wherein R and x have the aforesaid meaning.
* * * * *